Oct. 8, 1940.  P. D. WESTON  2,216,996
CONTINUOUSLY OPERABLE MACHINE FOR THE EXPRESSION FROM SOLIDS
OF LIQUIDS ASSOCIATED THEREWITH
Filed Nov. 19, 1937    4 Sheets-Sheet 4
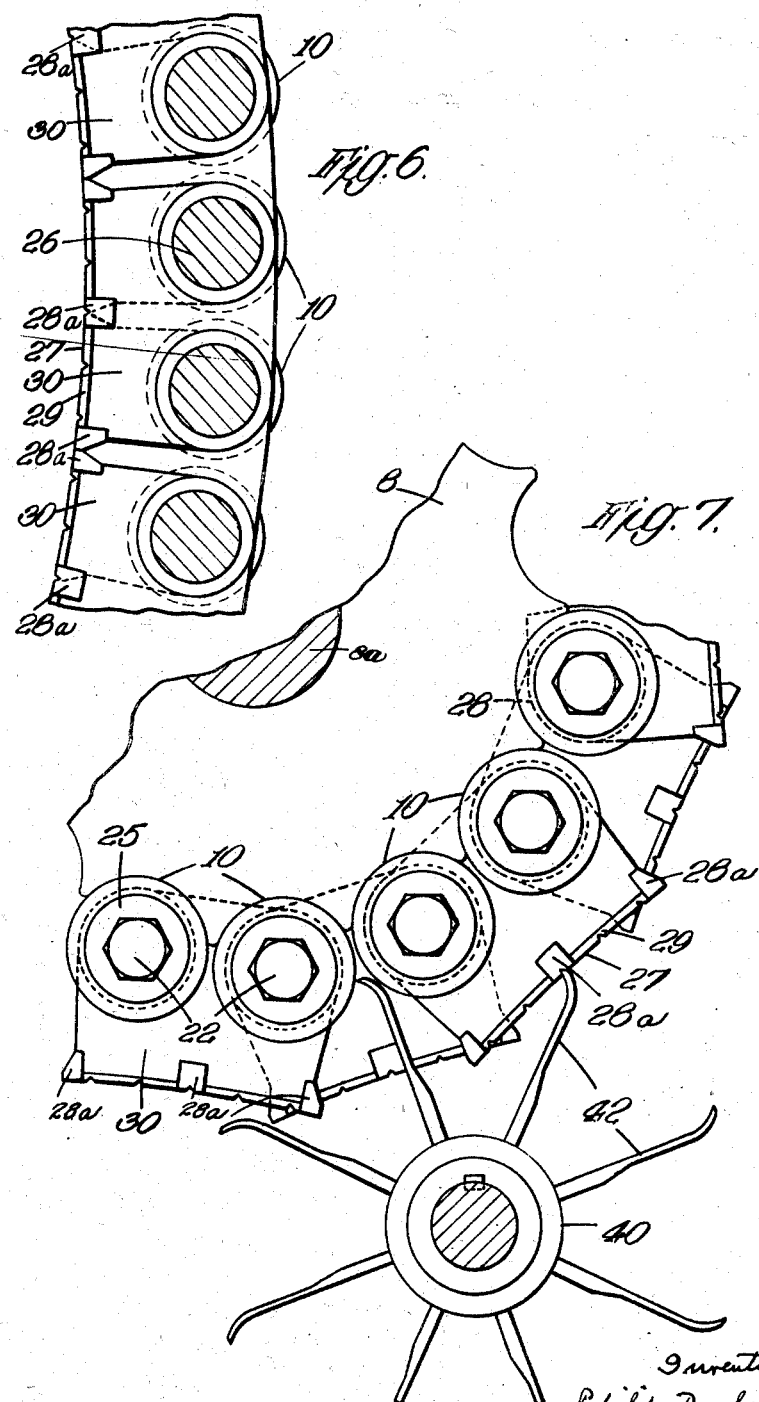

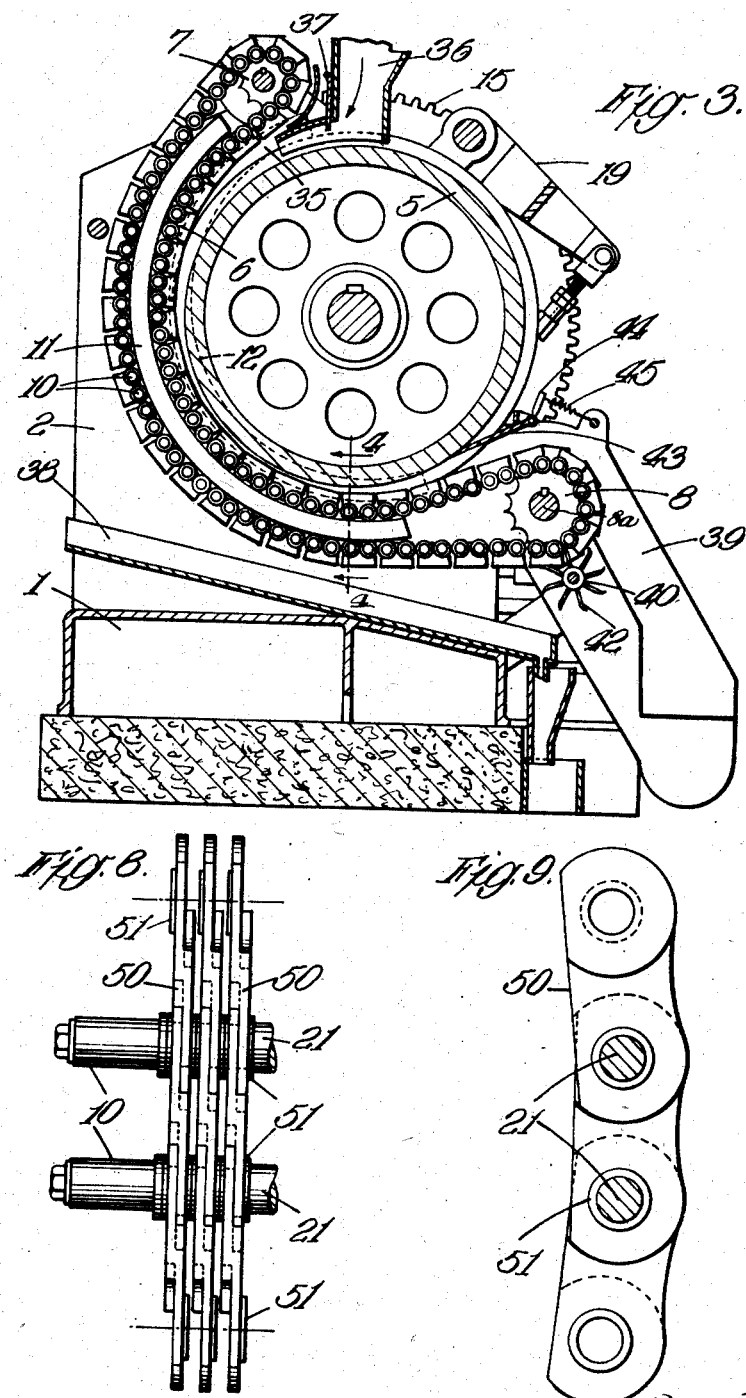

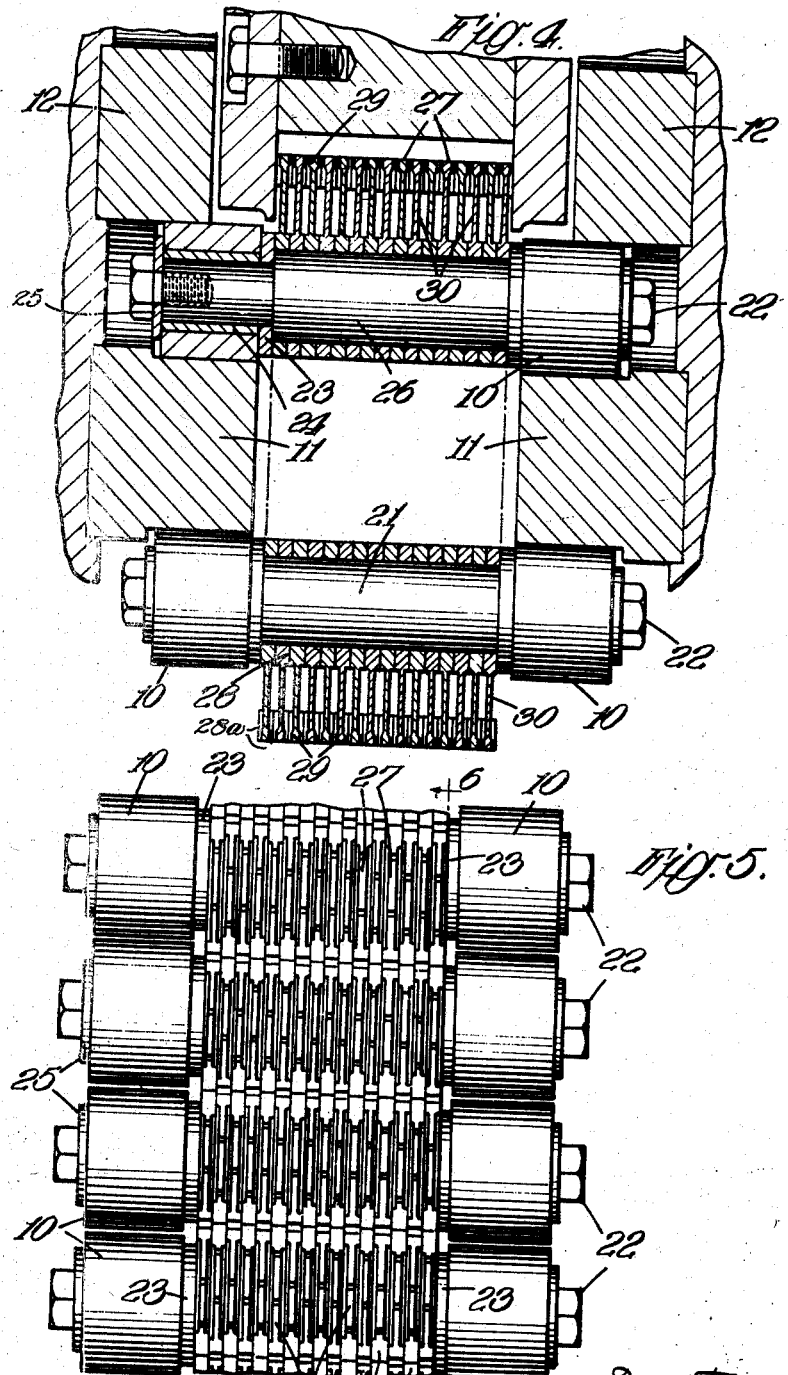

Patented Oct. 8, 1940

2,216,996

UNITED STATES PATENT OFFICE 2,216,996

CONTINUOUSLY OPERABLE MACHINE FOR THE EXPRESSION FROM SOLIDS OF LIQUIDS ASSOCIATED THEREWITH

Philip Douglas Weston, Barlby, near Selby, England, assignor to Lever Brothers Company, Cambridge, Mass., a corporation of Maine Application November 19, 1937, Serial No. 175,522 In Great Britain November 20, 1936

2 Claims. (Cl. 100—37)

This invention consists in a new continuously operable machine for the expression from solids of liquids associated therewith and is particularly concerned with a machine for the expression of oil from oil-bearing materials.

The machine according to the invention comprises a rotatable drum, an endless chain movable in a path spaced apart from the drum and rigid guide means for the chain arranged to constrain the movement of the chain in the operative portion of its path in such a manner that it gradually approaches the drum and cooperates with the adjacent curved surface of the drum to form a passageway having a restricted throat through which the solids may be drawn by movement of the chain and drum under progressively increasing pressure as the throat narrows, thereby expressing the liquids from the solids. The machine is further provided with means for feeding the liquid-containing solids to the passageway, and means for collecting the expressed liquid or the remaining solids or both liquid and solids. The chain is so constructed and arranged that over substantially the whole of the operative portion of its path the links of the chain form a substantially continuous smooth operating surface broken only by small passageways to allow of the escape of the expressed liquid.

In the preferred form of the invention, the chain is formed of a plurality of closely spaced plate-like links arranged in substantially parallel relationship and perpendicular to the periphery of the drum. The links may be arranged in staggered formation and curved on their operating edges (that is, the edges which are in contact with the solids) to the curvature of the path which they follow as they approach to, and move away from the drum.

The invention will be described with reference to the accompanying drawings which show, by way of example, a specific embodiment of a liquid-expressing machine according to the invention particularly suited to the expression of oils from oil-bearing materials, such as copra, palm kernels, groundnuts and the like, hereinafter referred to as oil-bearing seeds.

In the drawings—

Figure 3 is a section on the line 3—3 in Figure 2;

Figure 4 is an enlarged view in section on the line 4—4 in Figure 3 of the chain and guides and a portion of the drum;

Figure 5 is an enlarged view in elevation of a portion of the chain with the links in the "closed" position;

Figure 6 is a section on the line 6—6 in Figure 5;

Figure 7 is an enlarged side view showing a portion of the chain passing over the lower sprocket and a device for cleaning the chain;

Figure 8 is a view corresponding to Figure 5 of an alternative form of chain, and Figure 9 is a side view of the portion of the chain shown in Figure 8.

Like reference numerals refer to like parts in the several figures of the drawings.

Figure 1:
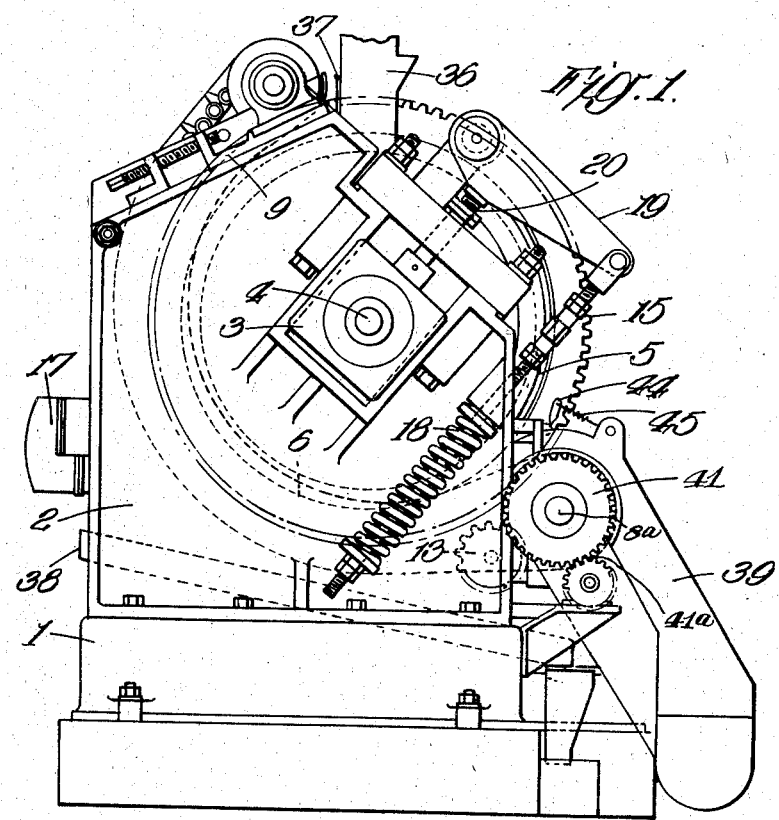
Figure 1 is a side elevation of the machine.
Figure 2:
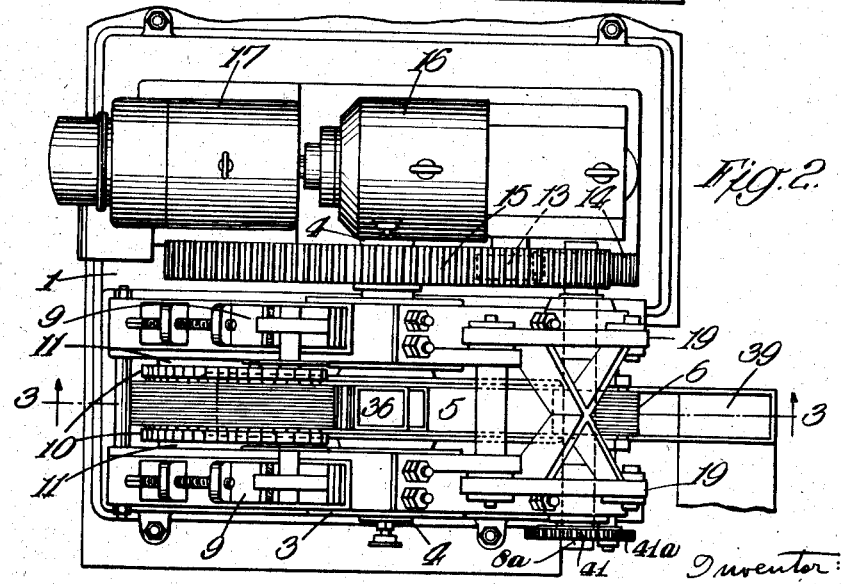
Figure 2 is a plan view.

The machine consists of a bed plate 1 and two side frames 2 supporting in bearings 3 a shaft 4 carrying a flanged pressure drum 5 around part of whose circumference passes a portion of an endless chain 6. The endless chain is mounted between the side frames, and is supported by two sprocket wheels 7 and 8, the sprocket 7 being supported from a bracket 9 which is adjustable in position on the side frames so as to allow for the fixing or removal or adjustment of the endless chain. The endless chain (which is later described in detail) is supported on rollers 10 which run on guides 11—12 arranged to constrain the chain to move along a path in the form of an arc of greater radius than the radius of the drum. The pressure drum and the endless chain work in conjunction with each other, travel in the same direction, and are timed by spur gearing 13, 14, 15 (driven through worm gearing 16 from an electric motor 17) to run at the same lineal (surface) speed. The centre from which the arcuate guides 11 and 12 are struck and the centre of the pressure drum 5 lie on a line which is at an angle of about 50° from the horizontal. The radius of the pressure drum and the radius of the working face of the chain, give a minimum clearance space between the two of about ⅜" at the restricted throat (i. e. on the line joining the two centres referred to)—the space increasing to 4" on a line passing through the centre of the pressure drum and the centre of the sprocket 7.

The bearings 3, and with them the drum 5, are slidable on the frames 2 in a direction along the line joining the centres of the drum and the arcuate guides 11 and 12, and are pressed towards the chain by springs 18 on each side of the drum acting through a frame 19 pivotally connected to the side frames and bearing against rods attached to the bearings. The purpose of this arrangement is to allow the drum to move away from the chain and thereby to relieve the pressure should it become excessive. The minimum separation between the drum and the chain may be adjusted by means of nuts 20 adjustable in position on the rods and arranged to abut against keepers for the bearings, through which the rods pass.

The endless chain which is shown in detail in Figures 4–7 is constructed of links or flat plates mounted in staggered formation on gudgeons or pins 21, which extend on each side of the endless chain, and are furnished at each end with loose rollers 10, which run between the above-mentioned guides 11 and 12. The links are held together laterally by screws 22 in each end of the gudgeons, in co-operation with washers 23, bushes 24 and washers 25, the portions 26 of the gudgeons between the washers 23 being of length such that sideways movement of the links is prevented without preventing the links from rotating on the gudgeons. The screws 22 are provided with either right hand or left hand threads and are so chosen that the rotary movement of the rollers tends to prevent the screws from unscrewing.

The links are made concave on the working faces 27 (see Figure 7), and are provided with facings 28 of greater thickness than the remainder of the links at the bearings for the gudgeons to give lateral support between adjacent links. The top edge of each link is reduced in thickness as shown at 29 to allow the oil expressed from the seed to pass through the chain, and the body portions 30 of the links are of still less thickness (see Figure 4). To prevent the solids from being forced between the links, lateral projections 28a are provided at intervals along the working faces 27 of the links. Narrow gaps between the ends of adjacent links are also provided for the passage of the expressed oil through the chain, the links being so proportioned as to provide these gaps when the ends of the links are closest together, i. e. when the links are travelling over the operative portion of their path.

The pressure drum 5 is cylindrical, and in this example has a smooth face on the circumference. The drum face may, however, be provided with grooves extending in a direction between the flanges for the purpose of gripping the material when passing through the apparatus. The drum may also be provided with holes or slots, to assist the filtration or drainage of the expressed oil.

Cheek plates 35 (Figure 3) are fixed on the side frames 2 on each side of the endless chain to fill in the sides of the passageway between the chain and the drum and to prevent the meal spreading in the early stages of compression before the concave links of the endless chain come within the channel formed by the flanges and circumferential face of the pressure drum.

In the operation of the machine the seed-meal after having been suitably conditioned, (by grinding and cooking) is transferred to a feed hopper 36 provided with an adjustable slide 37 for controlling the rate of delivery from the hopper into the passageway between the pressure drum and the chain. The seed-meal is gradually compressed as it is carried into the restricted portion of the passageway by the movement of the drum and chain and the expressed oil passes through the filter space between the links of the endless chain, and through the opposite length of the chain, into a collecting trough 38, whilst the solid residue is carried forward on the surface of the endless chain and delivered into a chute 39. If desired the collecting trough may be located between the two laps of the chain.

The compression of the seed-meal gradually increases until it has reached the point of minimum separation between the chain and the drum, after which the pressure eases off, owing to the widening of the space between the chain and the drum. The flow of oil ceases, and the meal residue, which is compressed into a light cake forming a continuous layer on the chain, is carried over and deposited into the chute 39.

Any meal residue adhering between the side and ends of the links of the endless chain is automatically removed by a cleaner 40 in the form of revolving fingers, sweeping between the ends of the links, when they pass round the bottom terminal. This cleaner is driven by gearing 41, 41a from the shaft 8a carrying the sprocket 8 in such timed relationship with the sprocket that one of the sets of fingers 42 sweeps out the spaces between the ends of each pair of links as they arrive opposite to the cleaner. The fingers 42 are arranged in rows and spaced apart the thickness of one chain link. In the form shown in Figure 7, the fingers in one row are in staggered relationship with those in the next row so as to conform with the staggered formation of the links and spaces. In the present example there are four fingers in each row.

A scraper plate 43 removes any meal adhering to the face of the pressure drum, and comprises a plate bolted to a bellcrank 44 and pressed against the drum face by a spring 45.

In the preferred construction, the links are staggered as described above, which ensures that the filter surface or plates are cleared automatically by the movement of the links against each other, when they open up again after having reached the closed position.

An alternative form of chain suitable for use in a machine according to the invention is shown in Figures 8 and 9. In this form of chain the adjacent ends of the links 50 are halved together so that each longitudinal row of links consists of a substantially continuous length. The links are pivotally supported on gudgeons or pins 21 as in the previous example, the gudgeons being provided at each end with rollers 10. Passageways between the rows of links for the expressed oil may be provided by forming separating bosses 51 around the bearings for the gudgeons.

In the usual operation of the machine, the oil-bearing seeds pass through the passageway between the chain and the drum in direct contact therewith, but in certain cases such as, for example, in the case of rapeseed or shea nuts, where it is desirable to grind the seed very finely, it may be an advantage to insert a filter cloth in the form of a belt over the operating portion of the chain, so as to provide a finer filter medium. The filter cloth belt may be superimposed on the chain, and in cases where the oil collecting trough is not located between the two laps of the chain may be guided away from the lower lap of the chain so as not to interfere with the filtering of the oil through both laps of the chain.

In the extraction of oil by pressure, the oil is frequently expressed in two stages. The second pressing, which is effected under higher pressure than the first pressing, is usually carried out by means of hydraulic presses, while the preliminary pressing is effected either by hydraulic presses or in screw presses of the type of the Anderson expeller, hereinafter briefly referred to as "Anderson presses." The machine according to the invention is particularly suitable as a preliminary press to be followed in the usual way by hydraulic presses. It can also be used in conjunction and co-operation with the usual Anderson presses, a method which has been found particularly efficient and economic. This method consists briefly in passing the seed meal first through the machine according to the invention, thereafter putting the partially expressed meal through an Anderson press or series of Anderson presses arranged in parallel to remove a further portion of the oil, and finally pressing the meal in an hydraulic press to reduce its oil content to the proportion desired in the residual cake.

I claim:

1. In a liquid expressing device, the combination of a frame, a drum having spaced peripheral flanges rotatably mounted in said frame, opposed curved rigid guide members on said frame and eccentric to said drum, a chain having a plurality of closely spaced links providing a substantially continuous surface adjacent to and having a portion thereof disposed between the said flanges, rollers on the lateral edges of said chain engaging the guide members, means for resiliently resisting relative displacement of the drum and the chain, and means for moving adjacent surfaces of the chain and the drum at substantially the same speed.

2. The device set forth in claim 1 in which the chain comprises a plurality of links, each link consisting of a plurality of closely spaced plate-like elements perpendicular to the surface of the chain, and having a concavely curved edge substantially equal in radius to the periphery of the drum, said edge being thickened to substantially contact the corresponding edge of an adjacent parallel element, pivot pins connecting the links to form a chain and thickened portions on the links forming wide bearings for the pivot pins and engaging said bearings of adjacent links.

PHILIP DOUGLAS WESTON.